US011985390B2

(12) United States Patent
Dewa

(10) Patent No.: US 11,985,390 B2
(45) Date of Patent: May 14, 2024

(54) INFORMATION PROCESSING APPARATUS AND INFORMATION PROCESSING METHOD, AND INFORMATION PROCESSING SYSTEM

(71) Applicant: Sony Corporation, Tokyo (JP)

(72) Inventor: Yoshiharu Dewa, Tokyo (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 17/275,565

(22) PCT Filed: Sep. 2, 2019

(86) PCT No.: PCT/JP2019/034366
§ 371 (c)(1),
(2) Date: Mar. 11, 2021

(87) PCT Pub. No.: WO2020/090215
PCT Pub. Date: May 7, 2020

(65) Prior Publication Data
US 2022/0053241 A1    Feb. 17, 2022

(30) Foreign Application Priority Data

Oct. 29, 2018   (JP) ................................. 2018-202874

(51) Int. Cl.
*H04N 21/478*  (2011.01)
*B25J 11/00*  (2006.01)
(Continued)

(52) U.S. Cl.
CPC .......... *H04N 21/478* (2013.01); *B25J 11/001* (2013.01); *H04N 21/4126* (2013.01);
(Continued)

(58) Field of Classification Search
CPC ............. H04N 21/478; H04N 21/4126; H04N 21/8146; H04N 21/816; H04N 21/84;
(Continued)

(56) References Cited

U.S. PATENT DOCUMENTS 9,411,414 B2 *  8/2016  Zhou ........................ G06F 3/013
2007/0247979 A1 * 10/2007  Brillon ................. G11B 27/105
369/30.06

(Continued)

FOREIGN PATENT DOCUMENTS

JP      2002-118828 A     4/2002
JP      2003-324402 A    11/2003
(Continued)

OTHER PUBLICATIONS

International Search Report dated Nov. 26, 2019 in PCT/JP2019/034366 filed Sep. 2, 2019, 2 pages.

(Continued)

*Primary Examiner* — Adil Ocak
(74) *Attorney, Agent, or Firm* — Oblon, McClelland, Maier & Neustadt, L.L.P.

(57) ABSTRACT

Provided is an information processing apparatus and an information processing method, and an information processing system, each of which provides a service related to a broadcast-type moving picture content.

An information processing apparatus includes: a receiving unit that receives, from a first device, a notice of data including a location or acquisition method of information suggesting an action of a virtual character, the action corresponding to an event that occurs in a broadcast-type moving picture content; an acquisition unit that acquires the information on the basis of the data issued as a notice from the first device; a display unit capable of two-dimensional or three-dimensional display; and a control unit that controls (Continued)

driving of the virtual character, which is to be displayed using the display unit, on the basis of the information acquired by the acquisition unit.

12 Claims, 11 Drawing Sheets

(51) Int. Cl.
    *H04N 21/41*     (2011.01)
    *H04N 21/81*     (2011.01)
    *H04N 21/84*     (2011.01)

(52) U.S. Cl.
    CPC ....... *H04N 21/8146* (2013.01); *H04N 21/816* (2013.01); *H04N 21/84* (2013.01)

(58) Field of Classification Search
    CPC .. H04N 21/235; H04N 21/431; H04N 21/435; H04N 21/436; H04N 21/4312; H04N 21/43615; H04N 21/4363; B25J 11/001; G06F 13/00
    See application file for complete search history.

(56) References Cited

U.S. PATENT DOCUMENTS

| | | | |
|---|---|---|---|
| 2012/0014558 A1* | 1/2012 | Stafford | H04N 23/80 |
| | | | 382/103 |
| 2015/0379752 A1* | 12/2015 | Li | G06T 13/80 |
| | | | 715/752 |
| 2016/0285933 A1* | 9/2016 | Lee | H04L 67/14 |
| 2016/0286275 A1* | 9/2016 | Maeda | G06Q 30/0631 |
| 2017/0161387 A1* | 6/2017 | Schuchardt | G06F 1/163 |
| 2018/0026733 A1 | 1/2018 | Yang | |
| 2018/0115796 A1* | 4/2018 | Yang | H04L 1/00 |
| 2018/0139490 A1 | 5/2018 | Yamagishi | |
| 2018/0143645 A1* | 5/2018 | Lee | G05D 1/0246 |
| 2020/0035025 A1* | 1/2020 | Crocker | G06T 19/006 |

FOREIGN PATENT DOCUMENTS

| | | |
|---|---|---|
| JP | 2004-179696 A | 6/2004 |
| JP | 2006-245941 A | 9/2006 |
| JP | 2010-239360 A | 10/2010 |
| JP | 2013-247434 A | 12/2013 |
| JP | 2015-194864 A | 11/2015 |
| JP | WO2016/174960 A1 | 11/2016 |
| JP | 2017-139640 A | 8/2017 |
| JP | 2017-530567 A | 10/2017 |
| KR | 20110134814 A | 12/2011 |
| KR | 20140065121 A | 5/2014 |
| KR | 20160118859 A | 10/2016 |

OTHER PUBLICATIONS

International Search Report issued Nov. 26, 2019 in PCT/JP2019/034366 filed Sep. 2, 2019, 2 pages.

* cited by examiner

FIG. 6

```
[
  {
    "targetStreamEvent" : "eventId",   // Ev IN MOVING PICTURE ASSOCIATED
                                       //   WITH THIS SCENE DESCRIPTION
    "startTime" : "xxxxx",             // RELATIVE START TIME OF THAT EVENT (OPTION)

"endTime" : "yyyyy",               // RELATIVE END TIME OF THAT EVENT (OPTION)
    "category" : "soccer",             // TYPE OF EVENT
    {
      "event" : "goal",                // GOALED
      "team" : "AAAA",                 // TEAM NAME
      "score" : "2-3",                 // SCORING STATUS
    },
    o
    o
    o
    o
    o
    o
    o
  }
]
```

```
[
    {
        "character: aiKizuna",
    },
    {
        "category" : "soccer",          // TYPE OF EVENT
        {
            "event" : "goal",           // GOALED
            "emotion" : "happyOrsad",   // EMOTIONAL
                                        //  EXPRESSION
        },
    },
    {
        ○ ○ ○ ○ ○ ○ ○ ○ ○
    }
]
```

INFORMATION PROCESSING APPARATUS AND INFORMATION PROCESSING METHOD, AND INFORMATION PROCESSING SYSTEM

TECHNICAL FIELD

The technology disclosed in the present description relates to an information processing apparatus and an information processing method, and an information processing system, each of which provides a service related to a broadcast-type moving picture content.

BACKGROUND ART

It has been a long time since the television broadcasting services have become widespread. Moreover, recently, broadcast-type moving picture distribution services using a network, such as Internet Protocol TV (IPTV) and Over-The-top (OTT), have also been becoming widespread.

On the other hand, use of systems, each of which interprets a verbal or textual natural language input to infer a user's intention and executes an action such as an interaction with the user, has also been becoming widespread. Such systems equipped with this type of interaction function, also called "agents" or "assistants", are achieved as applications to be executed on dedicated electronic devices or information terminals such as televisions and smartphones. Moreover, the interaction function of this type of system is achieved using the artificial intelligence (AI) function, the back-end interaction engine connected via the Internet or the like, and the like.

For example, a proposal has been made for a virtual assistant that connects to a television or a set top box to control reproduction of a media and any other function (see Patent Document 1).

CITATION LIST

Patent Document

Patent Document 1: Japanese Translation of PCT International Application Publication No. 2017-530567

SUMMARY OF THE INVENTION

Problems to be Solved by the Invention

An object of the technology disclosed in the present description is to provide an information processing apparatus and an information processing method, and an information processing system, each of which provides a service related to a broadcast-type moving picture content.

Solutions to Problems

A first aspect of the technology disclosed in the present description is an information processing apparatus including:

a receiving unit that receives a broadcast-type moving picture content; and a notification unit that notifies a second device of data including a location or acquisition method of information suggesting an action of a virtual character, the action corresponding to an event that occurs in the moving picture content.

The information processing apparatus according to the first aspect is, for example, a television receiver that receives the moving picture content to be broadcast or streamed, and receives a trigger of the event by StreamEvent, WebSocket, or the like.

Moreover, a second aspect of the technology disclosed in the present description is an information processing method including:

a receiving step of receiving a broadcast-type moving picture content;

a displaying step of displaying the moving picture content on a display unit; and a notifying step of notifying, in response to an event that occurs in the moving picture content, a second device of data including a location or acquisition method of information suggesting an action of a virtual character.

Furthermore, a third aspect of the technology disclosed in the present description is an information processing apparatus including:

a receiving unit that receives, from a first device, a notice of data including a location or acquisition method of information suggesting an action of a virtual character, the action corresponding to an event that occurs in a broadcast-type moving picture content; and a control unit that acquires the information on the basis of the data issued as the notice from the first device, and controls driving of the virtual character on the basis of the acquired information.

The information processing apparatus according to the third aspect receives the notice from the first device as a television receiver that receives the broadcast-type moving picture content, and controls the driving of the virtual character to be displayed on a display unit capable of two-dimensional or three-dimensional display.

Moreover, a fourth aspect of the technology disclosed in the present description is an information processing method including:

a receiving step of receiving, from a first device, a notice of data including a location or acquisition method of information suggesting an action of a virtual character, the action corresponding to an event that occurs in a broadcast-type moving picture content;

an acquiring step of acquiring the information on the basis of the data issued as the notice from the first device; and a controlling step of controlling driving of the virtual character on the basis of information acquired in the acquiring step.

Furthermore, a fifth aspect of the technology disclosed in the present description is an information processing system including:

a first device that receives a broadcast-type moving picture content; and a second device that controls driving of a virtual character, in which in response to receiving a trigger of the event, the first device notifies the second device of data including a location or acquisition method of information suggesting an action of the virtual character, the action corresponding to an event that occurs in the moving picture content, and the second device acquires the information on the basis of the data issued as a notice from the first device, and controls driving of the virtual character.

However, the "system" mentioned herein refers to a logical assembly of a plurality of apparatuses (or functional modules which achieve a specific function), and it does not matter whether or not the respective apparatuses or functional modules are in a single housing.

EFFECTS OF THE INVENTION

In accordance with the technology disclosed in the present description, there can be provided the information processing apparatus and the information processing apparatus, and the information processing system, each of which automatically drives the virtual character in response to the content of the broadcast-type moving picture content.

Note that the effects described in the present description are merely examples, and the effects of the present invention are not limited thereto. Moreover, the present invention may exert additional effects in addition to the above effects.

Still other objects, features, and advantages of the technology disclosed in the present description will be apparent by a more detailed description based on the embodiments to be described later and the accompanying drawings.

BRIEF DESCRIPTION OF DRAWINGS

FIG. 6 is a diagram illustrating an example of scene description data.

MODE FOR CARRYING OUT THE INVENTION

A detailed description will be given below of embodiments of a technology disclosed in the present description with reference to the drawings.

Figure 1:
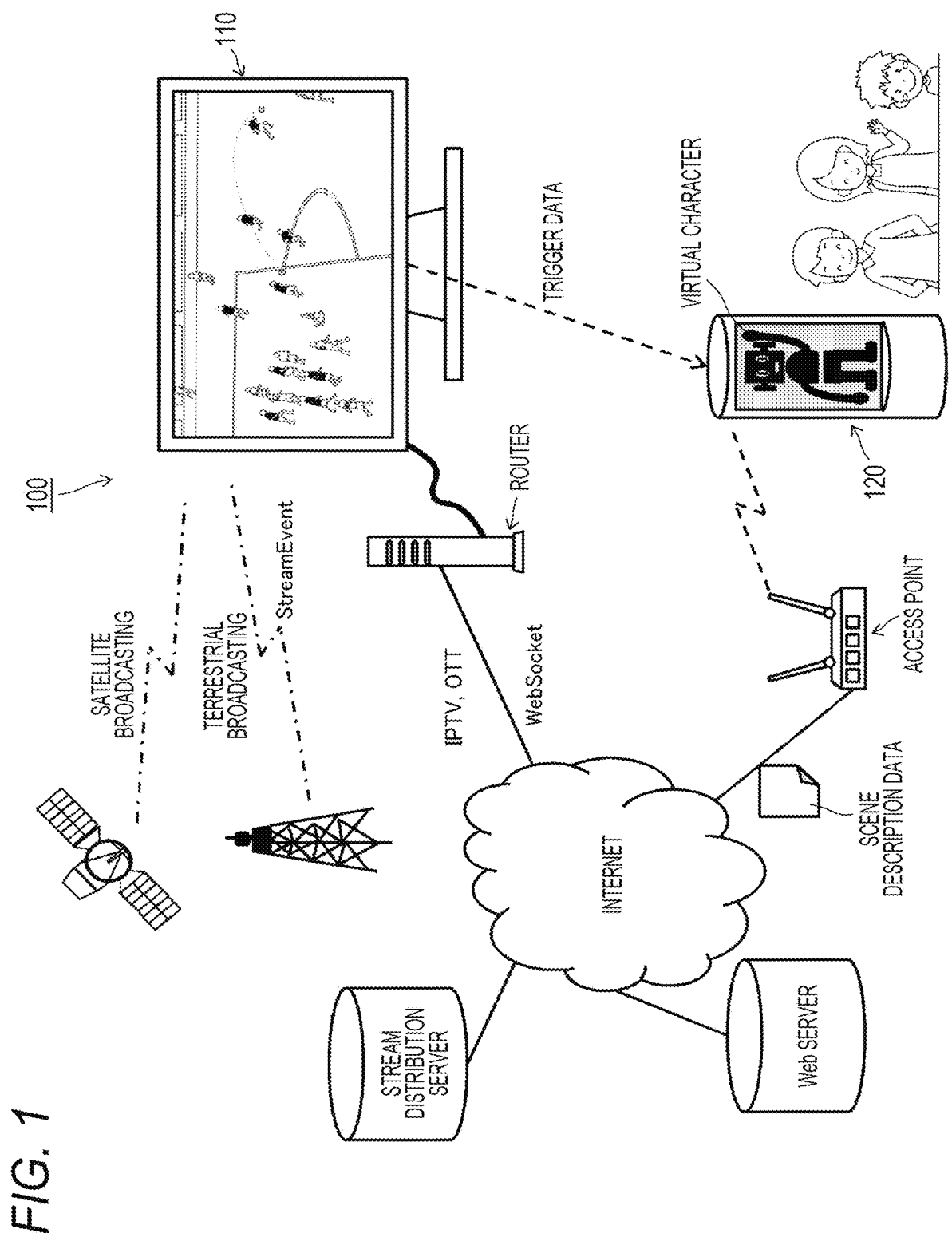
FIG. 1 is a diagram schematically illustrating a configuration example of an interaction system 100.

FIG. 1 schematically illustrates a configuration example of an interaction system 100 to which the technology disclosed in the present description is applied. The illustrated interaction system 100 includes a display apparatus 110 and an interaction apparatus 120.

It is basically assumed that the display apparatus 110 and the interaction apparatus 120 are used by the same user. For example, the display apparatus 110 and the interaction apparatus 120 are installed in a space such as a living room where the user stays. The display apparatus 110 displays a broadcast or streamed content, and the user views the content displayed by the display apparatus 110. Moreover, the interaction apparatus 120 interacts with the user, receives a command of speech, gesture, or the like from the user, and presents information to the user.

The display apparatus 110 is interconnected to an external network such as the Internet, for example, via a router. Moreover, the interaction apparatus 120 is interconnected to the external network such as the Internet via an access point installed indoors.

Furthermore, it is assumed that the display apparatus 110 and the interaction apparatus 120 are connected to each other via communication means (not shown). The communication means may be either wired or wireless. For example, the display apparatus 110 and the interaction apparatus 120 may be connected to each other using communication based on the existing communication standard such as Ethernet (registered trademark), Wi-Fi (registered trademark), and Bluetooth (registered trademark), or may be uniquely connected to each other. Moreover, only one-way communication from the display apparatus 110 to the interaction apparatus 120 may be performed using infrared communication or other simple communication means.

The display apparatus 110 is equipped with a large screen that displays a broadcast-type moving picture content. The display apparatus 110 includes, for example, a television receiver that selects and receives a broadcast signal; however, may be a display connected to a set top box. The broadcast signal may be either terrestrial or satellite. Moreover, a broadcasting service to be used by the display apparatus 110 is not limited to television broadcasting, and for example, a broadcast-type moving picture distribution service such as IPTV and OTT using a network can be included therein. In the latter case, the display apparatus 110 can include a display equipped with a network interface card. As a matter of course, a moving picture content provided by a push-based content distribution service other than these may be included.

Figure 2:
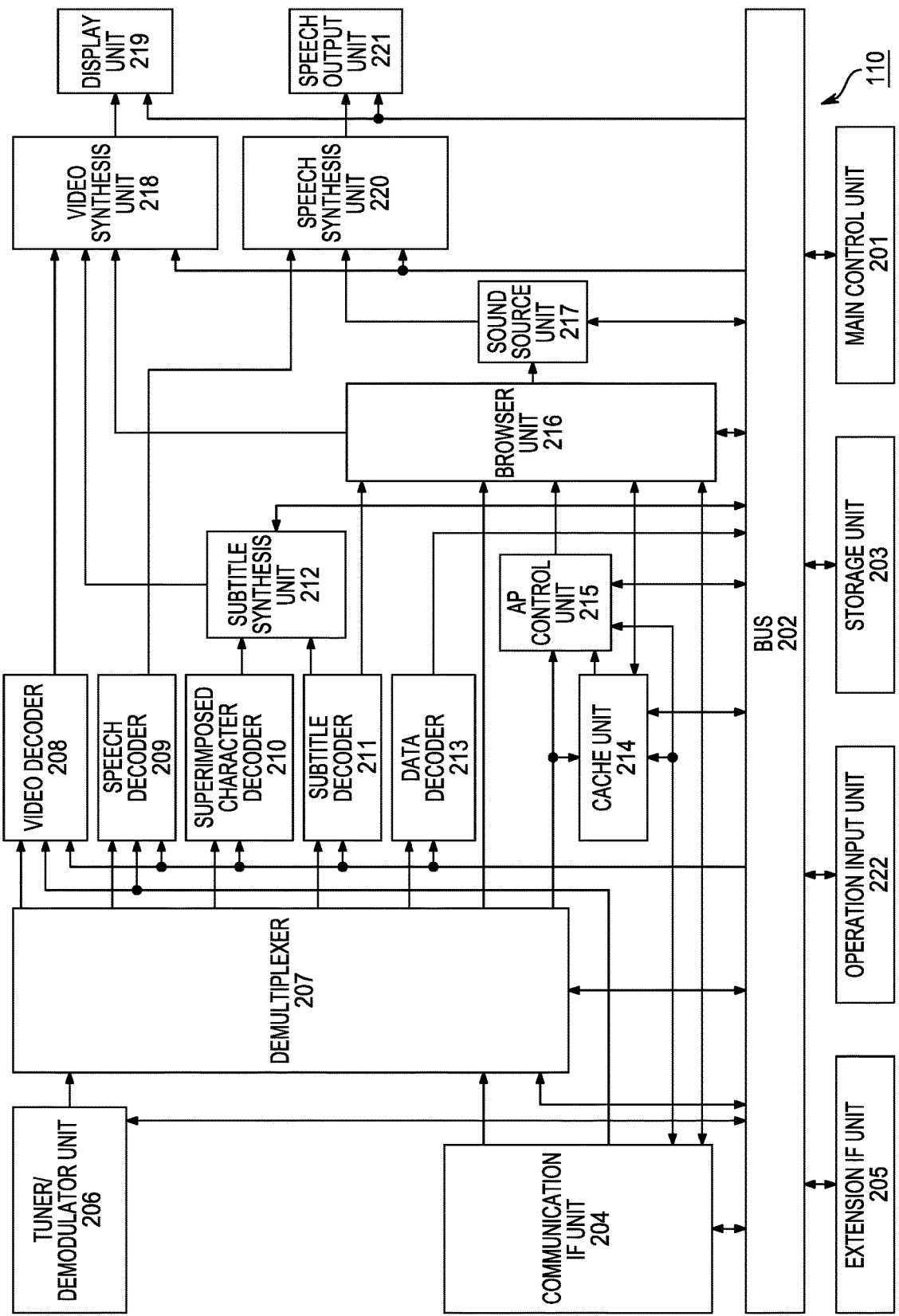
FIG. 2 is a diagram illustrating a configuration example of a display apparatus 110.

FIG. 2 illustrates a configuration example of the display apparatus 110. The display apparatus 110 includes a main control unit 201, a bus 202, a storage unit 203, a communication interface (IF) unit 204, an extension interface (IF) unit 205, a tuner/demodulator unit 206, a demultiplexer (DEMUX) 207, a video decoder 208, a speech decoder 209, a superimposed character decoder 210, a subtitle decoder 211, a subtitle synthesis unit 212, a data decoder 213, a cache unit 214, an application (AP) control unit 215, a browser unit 216, a sound source unit 217, a video synthesis unit 218, a display unit 219, a speech synthesis unit 220, a speech output unit 221, and an operation input unit 222.

The main control unit 201 includes, for example, a central processing unit (CPU), a read only memory (ROM), and a random access memory (RAM), and controls the entire display apparatus 110 in accordance with a predetermined operating program. The ROM is a non-volatile memory in which a basic operating program such as an operating system (OS) and other operating programs are stored. Operation setting values required for the operation of the display apparatus 110 may be stored in the ROM. The RAM serves as a work area when the OS and the other operating programs are executed. The bus 202 is a data communication path for transmitting/receiving data between the main control unit 201 and each unit in the display apparatus 110. Note that, in the present embodiment, it is assumed that trigger distribution synchronized with an event in the moving picture content is performed from the broadcasting service (broadcasting station or stream distribution server) side (described later); however, the main control unit 201 can receive a result of decoding the trigger distribution from the data decoder 213 (described later).

The storage unit 203 includes a non-volatile storage device such as a flash ROM, a solid state drive (SSD), and a hard disc drive (HDD). The storage unit 203 stores the operating program and operation setting values of the display apparatus 110, personal information of the user who uses the display apparatus 110, and the like. Moreover, the storage unit 203 stores an operating program downloaded via the Internet, various data created by the operating program, and the like Furthermore, the storage unit 203 is also able to store contents such as moving pictures, still images, and sounds, which are acquired through broadcast waves and the Internet.

The communication interface unit 204 is connected to the Internet via a router (mentioned above) or the like, and transmits/receives data to/from each server apparatus or other communication devices on the Internet. Moreover, it is assumed that the communication interface unit 204 also acquires a data stream of a program transmitted via a communication line. The communication interface unit 204 may be connected to the router by either a wired connection such as Ethernet (registered trademark) or a wireless connection such as Wi-Fi (registered trademark). Furthermore, the communication interface unit 204 may include communication means with the interaction apparatus 120. The communication means with the interaction apparatus 120 may be only one-way communication to the interaction apparatus 120.

The tuner/demodulator unit 206 receives a broadcast wave such as a terrestrial broadcast or a satellite broadcast via an antenna (not shown), and tunes (selects) to a channel of a service (broadcasting station or the like), which is desired by the user, on the basis of the control of the main control unit 201. Moreover, the tuner/demodulator unit 206 demodulates the received broadcast signal to acquire a broadcast data stream. Note that the display apparatus 110 may have a configuration of mounting a plurality of tuner/demodulator units (that is, multiple tuners) for the purpose of simultaneously displaying a plurality of screens, recording a competing program, or the like.

On the basis of a control signal in the received broadcast data stream, the demultiplexer 207 distributes a video data stream, a speech data stream, a superimposed character data stream, and a subtitle data stream, which are elements to be presented in real time, to the video decoder 208, the speech decoder 209, the superimposed character decoder 210, and the subtitle decoder 211, respectively. Data input to the demultiplexer 207 includes data from the broadcasting service and the distribution service such as IPTV and OTT. The former is input to the demultiplexer 207 after being selected and demodulated by the tuner/demodulator unit 206, and the latter is input to the demultiplexer 207 after being received by the communication interface unit 204.

Moreover, the demultiplexer 207 reproduces a multimedia application and file-system data that is a component thereof, outputs the data to the application control unit 215, or temporarily stores the data in the cache unit 214. Moreover, the demultiplexer 207 extracts general-purpose data and outputs the general-purpose data to the data decoder 213 in order to use the general-purpose data for streaming data for data or an application for use in a player that presents data other than the above video, speech, and subtitle.

The video decoder 208 decodes the video data stream, which is received from the demultiplexer 207, and outputs video information. Moreover, the speech decoder 209 decodes the speech data stream, which is received from the demultiplexer 207, and outputs speech information. Furthermore, in order to simultaneously perform decoding processes for a plurality of types of video data streams and speech data streams, the display apparatus 110 may include pluralities of the video decoders 208 and the speech decoders 209.

The superimposed character decoder 210 decodes the character super data stream, which is received from the demultiplexer 207, and outputs superimposed character information. The subtitle decoder 211 decodes the subtitle data stream, which is received from the demultiplexer 207, and outputs subtitle information. The subtitle synthesis unit 212 synthesizes the superimposed character information, which is output from the superimposed character decoder 210, and the subtitle information, which is output from the subtitle decoder 211.

The data decoder 213 decodes a data stream that is multiplexed with a video and a speech into an MPEG-2 TS stream. In the present embodiment, the data decoder 213 notifies the main control unit 201 of a result of decoding a general-purpose event message stored in a descriptor area of a program map table (PMT) that is one of program specific information (PSI) tables. Moreover, the data decoder 213 decodes data transmitted using WebSocket, and notifies the main control unit 201 of the decoded data. Specifically, trigger distribution synchronized with the event in the moving picture content is performed using StreamEvent, WebSocket, or the like, and the data decoder 213 notifies the main control unit 201 of a result of decoding the trigger distribution.

The application control unit 215 receives control information, which is included in the broadcast data stream, from the demultiplexer 207, or acquires control information from the server apparatus on the Internet 200 via the communication interface unit 204, and interprets these pieces of the control information.

In accordance with an instruction of the application control unit 215, the browser unit 216 presents a multimedia application file, which is acquired from the server apparatus on the Internet via the cache unit 214 or the communication interface unit 204, and a file-system data that is a component thereof. The multimedia application file referred to here is, for example, a hyper text markup language (HTML) document, a broadcast markup language (BML) document, or the like. Moreover, it is assumed that the browser unit 216 also reproduces speech information of the application by acting on the sound source unit 217.

The video synthesis unit 218 receives the video information output from the video decoder 208, the subtitle information output from the subtitle synthesis unit 212, and such application information output from the browser unit 216, and performs a process for appropriately selecting or superimposing the same. The video synthesis unit 218 includes a video RAM (not shown), and display drive of the display unit 219 is implemented on the basis of video information input to the video RAM. Moreover, on the basis of the control of the main control unit 201, according to needs, the video synthesis unit 218 also performs a superimposition process for superimposing screen information such as an electronic program guide (EPG) screen and graphics generated by the application executed by the main control unit 201.

The display unit 219 is a display device including, for example, a liquid crystal display or an organic electroluminescence (EL) display, and presents, to the user, video information selected or subjected to the superimposition process by the video synthesis unit 218.

The speech synthesis unit 220 receives the speech information output from the speech decoder 209 and the speech information of the application, the speech information being reproduced by the sound source unit 217, and performs a process such as appropriate selection and synthesis thereof.

The speech output unit 221 includes one or a plurality of speakers. The speech output unit 221 may be a speaker array (multi-channel speaker or ultra multi-channel speaker) in which a plurality of speakers is combined with one another, or a panel speaker. The speech output unit 221 presents, to the user, speech information processed by the speech synthesis unit 220.

The extension interface unit 205 is a group of interfaces for extending the functions of the display apparatus 110, and includes, for example, an analog video/speech interface, a universal serialbus (USB) interface, a memory interface, and the like. The extension interface unit 205 may include a digital interface including a digital visual interface (DVI) terminal, an HDMI (registered trademark) terminal, a Display Port (registered trademark) terminal, and the like.

The operation input unit 222 is an instruction input unit by which the user performs input of an operation instruction to the display apparatus 110. The operation input unit 222 includes, for example, a remote control reception unit that receives a command transmitted from a remote controller (not shown) and an operation key in which button switches are arranged. Moreover, the operation input unit 222 may include a touch panel superimposed on a screen of the display unit 219. Furthermore, the operation input unit 222 may include an external input device such as a keyboard connected to the extension interface unit 205.

As well as the television receiver, the display apparatus 110 may be a disc drive recorder such as a Blu-ray (registered trademark) disc recorder and an HDD recorder, a set top box (STB), a multifunctional information terminal such as a personal computer and a tablet, a navigation apparatus, a gaming machine, and the like, each of which is equipped with a digital broadcast reception function and a broadcast communication cooperation function.

A description will be given while referring to FIG. 1 one more time. The interaction apparatus 120 is a device that interprets a verbal or textual natural language input to infer a user's intention and achieves interaction with the user, and is equipped with a function also called a so-called "agent" or "assistant".

It is basically assumed that the interaction apparatus 120 is equipped with a sub-screen for displaying a virtual character that expresses a behavior of the "agent" or "assistant" (FIG. 1 illustrates a state in which a video of a virtual character is displayed on the sub-screen of the interaction apparatus 120). The interaction apparatus 120 autonomously drives this virtual character in response to an interaction with the user. It is preferable that the sub-screen include a screen having a 3D display function, for example, like a light field display or capable of realistic video expression, and can display the virtual character three-dimensionally. Note that a light field refers to a visible space including all the light within the field of view of an observer, and the light field display is ideally a display apparatus that reproduces all the light that enters the observer's eyes. However, the sub-screen of the interaction apparatus 120 just needs to have only a 2D display function.

Figure 11:
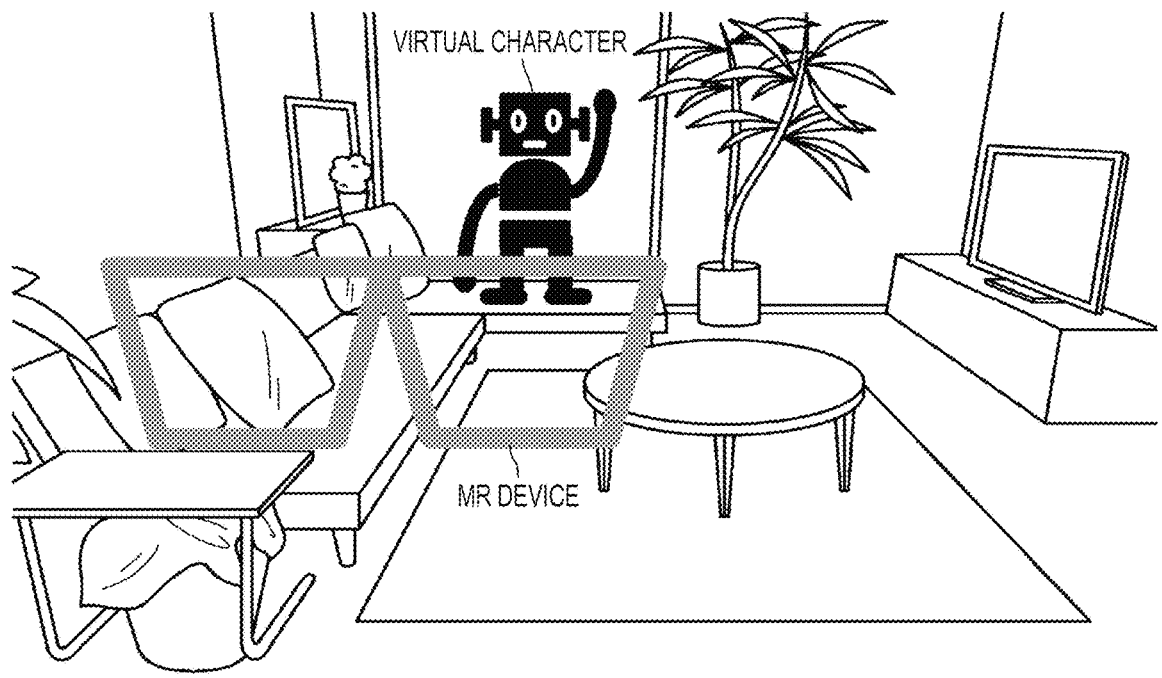
FIG. 11 is a diagram exemplifying a mixed reality space in which an image of a virtual character appears in a room by an MR device.

Alternatively, the interaction apparatus 120 may be a mixed reality (MR) device such as a head-mounted display that displays a video of the virtual character in a complex manner in a real space. FIG. 11 exemplifies a mixed reality space in which the video of the virtual character appears in a room by the MR device.

Figure 12:
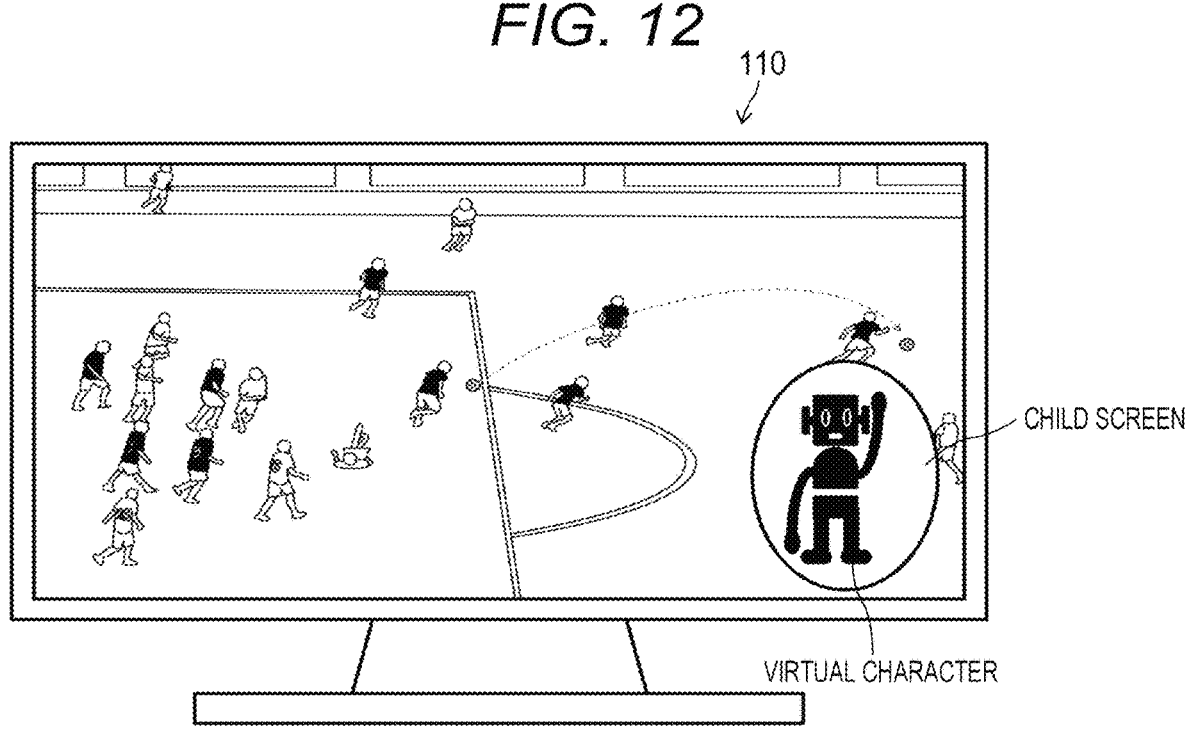
FIG. 12 is a diagram illustrating a state in which the virtual character is displayed on a sub-screen provided on a main screen that displays a main part of a broadcast program.

Alternatively, on the television receiver for use as the display apparatus 110, an application for autonomously driving the virtual character that interacts with the user may be started, a child screen may be provided in the screen of the display unit 219, and the virtual character may be displayed thereon. FIG. 12 is a diagram illustrating a state in which the virtual character is displayed on such a sub-screen provided on a main screen that displays a main part of a broadcast program.

Figure 13:
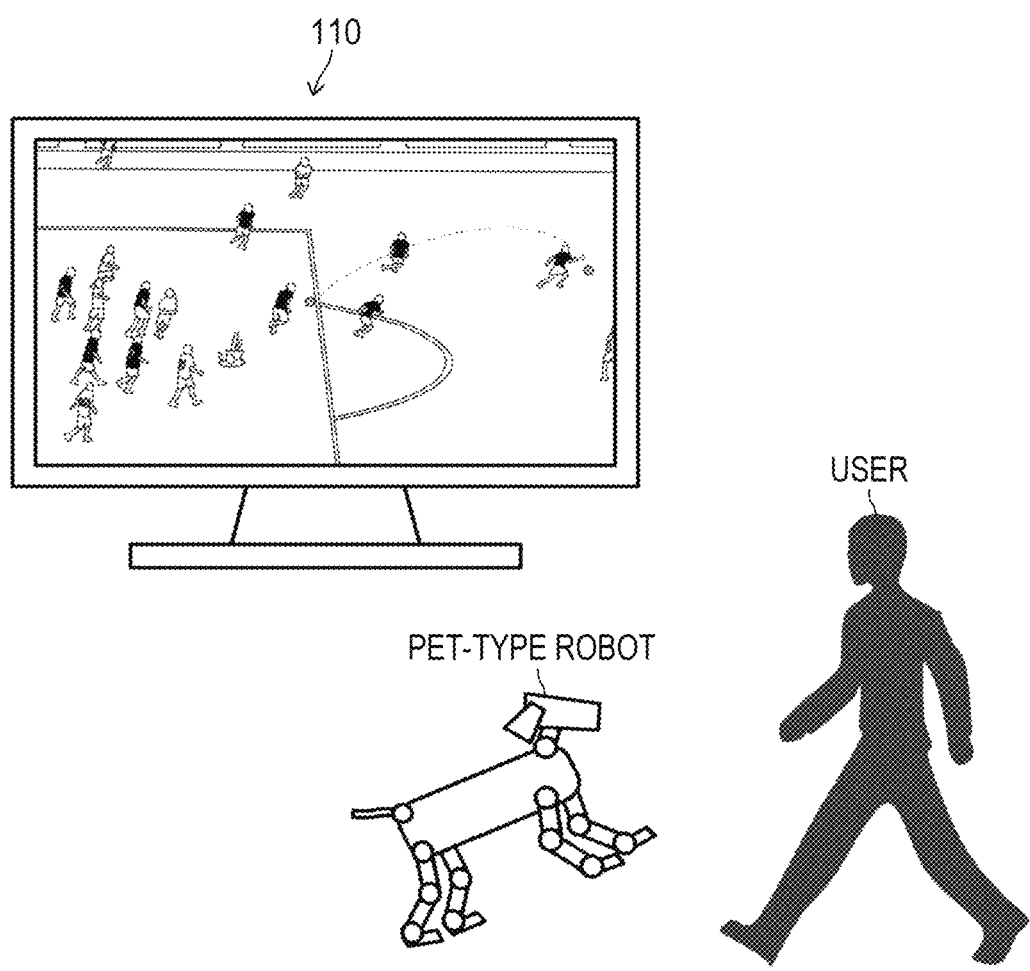
FIG. 13 is a diagram illustrating a state in which a pet-type robot is autonomously driven in response to a content of a broadcast-type data content that is being viewed thereby together with a user.

Alternatively, the interaction apparatus 120 may be a pet-type robot instead of the device equipped with the sub-screen that displays the virtual character three-dimensionally, and may express a behavior as an "agent" or "assistant" by joint movement of the robot. In this case, the interaction apparatus 120 responds to an interaction with the user, and the robot autonomously drives a movable portion such as a joint. FIG. 13 illustrates a state in which the pet-type robot is autonomously driven in response to a content of a broadcast-type data content that is being viewed thereby together with the user.

Alternatively, it is also assumed that an application of the "agent" or the "assistant" is started on an information terminal such as a smartphone and tablet owned by the user and is used as the interaction apparatus 120. In this case, the virtual character is displayed on a screen of the information terminal or a display externally connected to the information terminal. Moreover, it is also assumed that the application is started on an information home appliance installed in a room where the display apparatus 110 is present, and is used as the interaction apparatus 120.

In short, the interaction apparatus 120 is basically a device equipped with a 3D display function;

however, is also replaceable with a device of another form. In the present embodiment, it is assumed that, in any form, the interaction apparatus 120 views the broadcast-type moving picture content, which is displayed on the display apparatus 110, together with the user.

Figure 3:
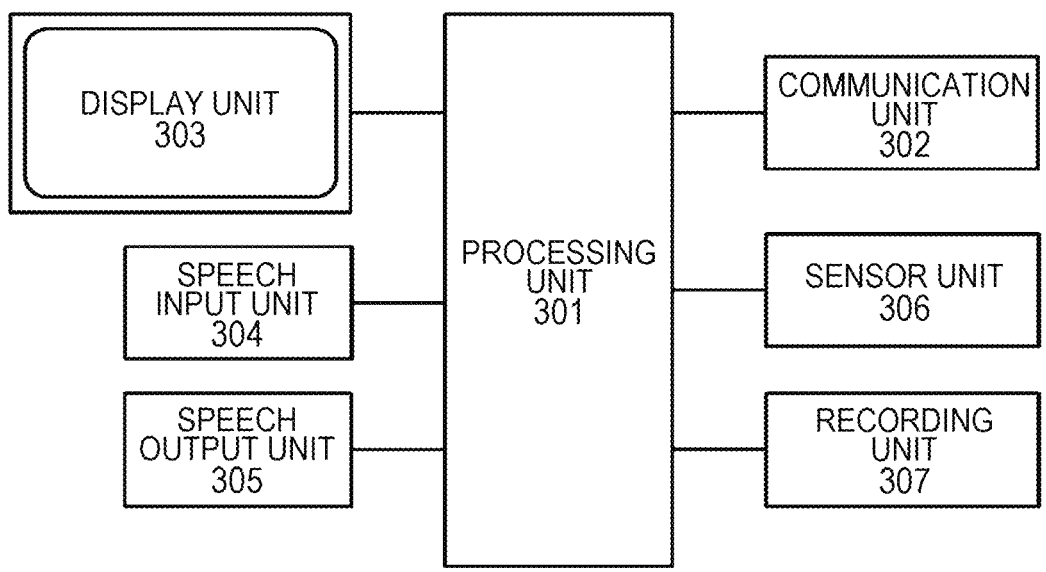
FIG. 3 is a diagram schematically illustrating a configuration example of an interaction apparatus 120.

FIG. 3 schematically illustrates a configuration example of the interaction apparatus 120. However, in FIG. 3, a dedicated device such as a speech agent is assumed as the interaction apparatus 120. The interaction apparatus 120 includes a processing unit 301, a communication unit 302, a display unit 303, a speech input unit 304, a speech output unit 305, a sensor unit 306, and a recording unit 307.

The communication unit 302 connects to an external network such as the Internet via an access point (see FIG. 1) using wired communication such as Ethernet (registered trademark) or wireless communication such as Wi-Fi (registered trademark). Moreover, the communication unit 302 may be interconnected to each home CE device via a home network, for example, in accordance with a standard such as digital living network alliance (DLNA) (registered trademark), or may further include an interface function with an Internet of Things (IoT) device.

It is assumed that, in the interaction system 100 according to the present embodiment, the display unit 303 functions as a "sub-screen" for the main screen of the display apparatus 110 to display the virtual character that expresses the behavior of the "agent" or "assistant". More preferably, the display unit 303 includes a screen that has a 3D display function, for example, such as the light field display (mentioned above) or is capable of realistic video expression, and can display the virtual character three-dimensionally. As a matter of course, the display unit 303 just needs to have only a 2D display function. However, the display unit 303 can also include an MR device or other display externally connected to the interaction apparatus 120.

The speech input unit 304 includes a sound collecting element such as a microphone, and is used for receiving speech generated in a room in which the interaction apparatus 120 is installed. As the speech generated in the room, utterances by a viewer of a television program or a user who uses a speech agent can be mentioned. The speech input unit 304 may include a microphone array in which a plurality of microphones is combined with one another.

The speech output unit 305 includes an audio generating element such as a speaker. A cone-type speaker, a flat panel -type speaker, or the like can be used for the speech output unit 305. Moreover, the speech output unit 305 may include a speaker array (multi-channel speaker or ultra multi-channel speaker) in which a plurality of speakers is combined with one another. The speech output unit 305 is used for outputting a synthetic speech of a speech agent function, for example.

The sensor unit 306 senses, for example, environmental information in the room where the interaction apparatus 120 is installed. The configuration of the sensor unit 306, that is, what kind of sensor element is included therein is arbitrary. For example, the sensor unit 306 may include a camera, an object detection sensor, and a depth sensor. Moreover, the sensor unit 306 may include an environment sensor that detects environmental information, such as an illuminance sensor, a temperature sensor, and a humidity sensor. Furthermore, the sensor unit 306 may include an infrared sensor or a human sensor. Moreover, the sensor unit 306 may include a biosensor that detects user's pulse, sweating, brain wave, myogenic potential, exhalation, and the like. Furthermore, the sensor unit 306 may include an inertial measurement unit (IMU) to detect a posture of a main body of the interaction apparatus 120 or the like.

The recording unit 307 includes, for example, a large-capacity recording device such as an HDD and an SSD, and is used for recording various data. The recording unit 307 is disposed in the interaction apparatus 120, and further, may be externally connected to the interaction apparatus 120 via an interface such as a USB.

The processing unit 301 includes a processor and a memory, executes a program loaded in the memory, implements various processes, and comprehensively controls the operation in the interaction apparatus 120. In the processing unit 301, basically, various applications are executed under an execution environment provided by the OS. For example, in a case where a multiprocessor is usable, or in a case where multithread execution is possible by the OS, all units of processes executable in parallel can be read into the memory and executed in parallel.

Among the applications to be executed by the processing unit 301, there can be mentioned an interactive application for achieving an interaction function with the user, such as a speech agent. Moreover, parallel execution of a plurality of the interactive applications by the processing unit 301 also makes it possible to cause the interaction apparatus 120 to function as a plurality of agent devices. In the present embodiment, it is assumed that the interactive application presents the virtual character on the display unit 303.

The interaction apparatus 120 may be equipped with an AI function in order to achieve a function to fully interact with the user. Moreover, the interaction apparatus 120 may be configured not as a stand-alone apparatus as illustrated in FIG. 1 or the like, but as a front end of an interaction engine, and may be configured to operate under control of a back end by an interaction engine including a server or a cloud on the Internet.

Figure 4:
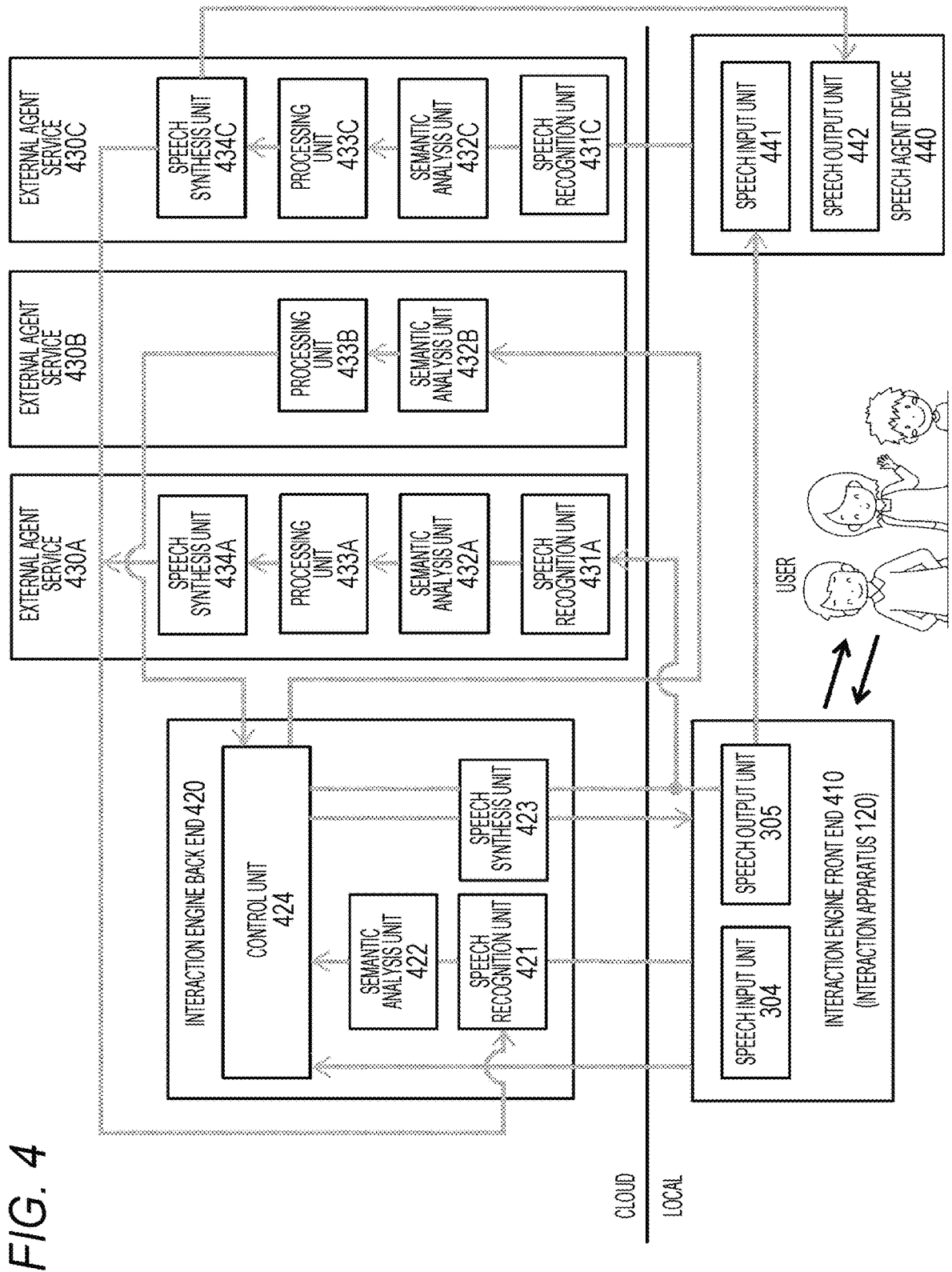
FIG. 4 is a diagram illustrating a functional configuration example of an interaction engine front end 410 and an interaction engine back end 420.

FIG. 4 illustrates a functional configuration example of the interaction engine front end 410 and the interaction engine back end 420.

The interaction engine front end 410 is an interactive application that is disposed on the local side (that is, near the user) and is executed by the interaction apparatus 120, and can take advantage of the respective function modules of the speech input unit 304, the speech output unit 305, and the like, which are equipped in the interaction apparatus 120.

Meanwhile, a cloud side includes the interaction engine back end 420 and a plurality of external agent services 430A, 430B, 430C, . . . The interaction engine back end 420 and the external agent services 430A, 430B, 430C, . . . all provide agent services which answer an inquiry from the user on the local side. However, while the former cooperates directly with the interaction engine front end 410, the latter does not work directly with the interaction engine front end 410, but indirectly provides an agent service to the interaction engine front end 410 through the intervention of the interaction engine back end 420, and accordingly, is called an "external agent service" to be distinguished from the interaction engine back end 420. Moreover, at least a part of the external agent services 430A, 430B, 430C, . . . (the external agent service 430C in the example illustrated in FIG. 4) directly cooperates with an speech agent device 440 installed on the local side.

The interaction engine back end 420 includes a speech recognition unit 421, a semantic analysis unit 422, a speech synthesis unit 423, and a control unit 424.

The speech recognition unit 421 performs speech recognition for a user's utterance collected by the speech input unit 304 on the interaction engine front end 410 side and converts the user's utterance into text information. The semantic analysis unit 332 performs semantic analysis for data of the user's utterance on the basis of the text information obtained by the speech recognition. Moreover, the speech synthesis unit 423 converts, into speech data, text information that serves as an answer or a feedback to the user. The speech data is sent to the interaction engine front end 410, and is output as a speech to the user from the speech output unit 305. Note that the interaction engine front end 410 may give the user the feedback by an action or behavior of the virtual character, which is displayed on the screen of the display unit 303, in addition to such a speech output.

The control unit 424 executes a process for interacting with the user of the interaction engine front end 410. For example, the control unit 424 searches for information inquired by the user, acquires a content requested by the user, and places an order for a product. In order to achieve a superior answer for the inquiry from the user, the control unit 424 may be equipped with a learning function or an AI function. The control unit 424 may execute a part (or all) of the process for generating the virtual character to be displayed on the screen of the display unit 303.

Moreover, the control unit 424 can further take advantage of resources of the external agent services 430A, 430B, 430C, . . . in order to achieve a superior interaction with the user. The control unit 424 may call all the usable external agent services 430A, 430B, 430C, . . . , or may select and call some of the external agent devices.

Moreover, several methods for calling the external agent services 430A, 430B, 430C, . . . from the interaction engine back end 420 are conceived. For example, text information obtained by semantically analyzing the inquiry from the user by the semantic analysis unit 422 may be transmitted to the external agent service 430B, or speech data obtained by performing speech synthesis for the text information by the speech synthesis unit 423 may be transmitted to the external agent service 430A to make an inquiry in a form like a speech input from the user. Alternatively, in a case where the interaction engine back end 420 makes a request to the external agent service 430C, such a procedure can also be adopted, in which the speech data obtained by the speech synthesis by the speech synthesis unit 423 is transmitted to the interaction engine front end 410, a speech like an inquiry of the user is output from the speech output unit 305 of the interaction apparatus 120, and an inquiry is made through the speech agent device 440.

Furthermore, several methods for responding to the interaction system 100 from the external agent services 430A, 430B, 430C, . . . which are external resources are also conceived. For example, the external agent service 430B sends a processing result including text information or the like (or before the speech synthesis) to the interaction engine back end 420. Moreover, to the interaction engine back end 420, the external agent services 430A and 430C send speech data obtained by performing speech synthesis for the processing result. The interaction engine back end 420 performs, by the speech recognition unit 421, speech recognition for the speech data sent from the external agent services 430A and 430C, and semantically analyzes a result of the speech recognition by the semantic analysis unit 422.

Then, the control unit 424 aggregates the answers from the respective external agent services 430A, 430B, 430C, . . . at a level of a result of the semantic analysis, and generates an answer sentence for the user. A method for aggregating a plurality of the answers is arbitrary. An answer from a specific external agent service may be selected against an answer obtained by the interaction engine back end 420 itself, or an answer from a specific external agent service may be selected on the basis of a predetermined selection criterion such as a majority vote, or answers from a plurality of the external agent services may be synthesized with one another to generate one answer sentence. In any case, the speech synthesis unit 423 converts the answer sentence, which is generated by the control unit 424, into speech data, and sends the speech data to the interaction engine front end 410. Then, in the interaction engine front end 410, a speech of the answer to the user is output as a speech to the user from the speech output unit 305.

Functional configurations of the respective external agent services 430A, 430B, 430C, . . . are substantially similar to one another. The functional configuration of the external agent service 430C will be described below as a representative.

The external agent service 430C includes a speech recognition unit 431C, a semantic analysis unit 432C, a processing unit 433C, and a speech synthesis unit 434C.

The speech recognition unit 431C performs speech recognition for an utterance collected by a speech input unit 441 of the speech agent device 440, and converts the utterance into text information. Note that it is also assumed that the speech collected by the speech input unit 441 is a speech output from the speech output unit 305 of the interaction engine front end 410 as well as the user's utterance.

The semantic analysis unit 432C performs semantic analysis for data of the user's utterance on the basis of the text information subjected to the speech recognition. The processing unit 433C executes a process for answering an inquiry from the user. For example, when it is found from the result of the semantic analysis that a "start word" that specifies the external agent service 430C is input as a speech from the user, the processing unit 433C starts execution of the process.

The speech synthesis unit 434C converts, into speech data, text information that serves as the answer to the user. The speech data is sent to the speech agent device 440, and is output as a speech to the user from a speech output unit 442. Note that such a case is also assumed where the speech data generated by the speech synthesis unit 434C is transmitted to the interaction engine back end 420 and is input to the speech recognition unit 421 as well as that the speech data is transmitted to the speech agent device 440 and is output as a speech.

In the interaction system 100 according to the present embodiment, the display apparatus 110 that displays the broadcast-type moving picture content is positioned as the main screen, and meanwhile, the display unit 303 equipped in the interaction apparatus 120 is positioned as the sub-screen. Then, the interaction apparatus 120 autonomously drives the virtual character on the display unit 303 as the sub-screen. More specifically, while the interaction apparatus 120 has a function to interact with the user, when the interaction apparatus 120 views a broadcast-type moving picture content, which is displayed on the main screen of the display apparatus 110, together with the user, the virtual character on the sub -screen is autonomously driven to switch a facial expression, gesture, behavior, and action of its own in response to a content of the broadcast-type moving picture content.

The interaction system 100 according to the present embodiment has a main feature in that the interaction apparatus 120 autonomously drives the virtual character on the sub-screen in response to the content of the broadcast-type moving picture content that is being viewed together with the user.

Moreover, the interaction system 100 according to the present embodiment has another main feature in that information for suggesting autonomous driving of the virtual character is provided to the interaction apparatus 120 from the outside. In the present description, such information suggesting the autonomous driving of the virtual character is referred to as "scene description data". For example, a service side such as a broadcasting station or a stream distribution server may create or edit scene description data for a moving picture content to be broadcast or distributed, and may upload the scene description data to a predetermined website in advance.

For example, every time a broadcast channel is switched on the display apparatus 110 side, the interaction apparatus 120 switches the virtual character, which is to be displayed, on the basis of newly provided scene description data. Specifically, for each broadcasting station, the interaction apparatus 120 may switch the virtual character prepared on the service side.

Moreover, the interaction apparatus 120 may be switched to a virtual character dedicated to a program on the basis of the newly provided scene description data every time not the broadcast channel but a broadcast program is switched.

Furthermore, the interaction apparatus 120 may switch a virtual character, which is prepared on a distribution service side, on the basis of the newly provided scene description data every time a distribution source of the content is switched or a streaming content to be received is switched. Moreover, the interaction apparatus 120 may switch the virtual character, which is prepared on the distribution service side, not for each distribution source but for each distribution content.

Moreover, even in the same broadcast program or the same streaming content, the interaction apparatus 120 may switch the virtual character or control an action, which is expressed by the virtual character, on the basis of scene description data newly provided in response to a scene or context in the moving picture content.

For example, when a scene in a climax arrives while the user is viewing a drama program, the interaction apparatus 120 may express such an action of the virtual character that speaks for a user's emotion or synchronizes with the user on the basis of the newly provided scene description data.

Moreover, when a subject team (team supported by the user) scores a point or conversely concedes a point while the user is viewing a sports program of baseball, soccer, or the like, the interaction apparatus 120 may express such an action of the virtual character that speaks for a user's emotion or synchronizes with the user on the basis of the newly provided scene description data. For example, the interaction apparatus 120 rejoices together or nods when the subject team is dominant, or makes an interjection or changes the emotion or the facial expression following a progress of the moving picture content (which is a progress of a game, or the like).

Moreover, while the user is viewing a news program, the interaction apparatus 120 may express such an action of the virtual character that introduces a genre of interest to the user among domestic, international, social, economic, performing arts, sports, science, region, and the like on the basis of scene description data to be provided for each section.

Moreover, the interaction apparatus 120 may express an action, by which the virtual character introduces a product corresponding to a CM (commercial message) to be inserted into the main part of the program, on the basis of scene description data not of the main part of the program to be broadcast or streamed but to be newly provided at timing of the CM. At that time, the interaction apparatus 120 may perform matching processing between a user's profile and the product, and change a way of recommending the product by the virtual character in response to a degree of interest of the user in the product, and the like.

Moreover, it is assumed that, no matter which type of the moving picture content may be being viewed, the virtual character basically responds to a question and a chat from the user.

As described above, in the interaction system 100 according to the present embodiment, the interaction apparatus 120 switches the virtual character for each broadcast-type moving picture content or changes the emotional expression of the virtual character for each scene of the moving picture content on the basis of the scene description data to be sequentially provided. Hence, the user views the broadcast-type moving picture content together with the interaction apparatus 120, and can thereby enjoy the content more than in a case of viewing the content alone.

The interaction apparatus 120 may control the action of the virtual character in a standalone manner; however, as illustrated in FIG. 4, may control the action of the virtual character by a cooperative operation of the interaction engine front end 410 and the interaction engine back end 420.

Moreover, it is arbitrary whether the interaction apparatus 120 operates the virtual character completely according to the scene description data provided from the outside, operates the virtual character with reference to a description content of the scene description data to some extent, or autonomously operates the virtual character completely without being restricted by the description content of the scene description data. For example, the user may specify whether the interaction apparatus 120 should follow the scene description data.

Figure 5:
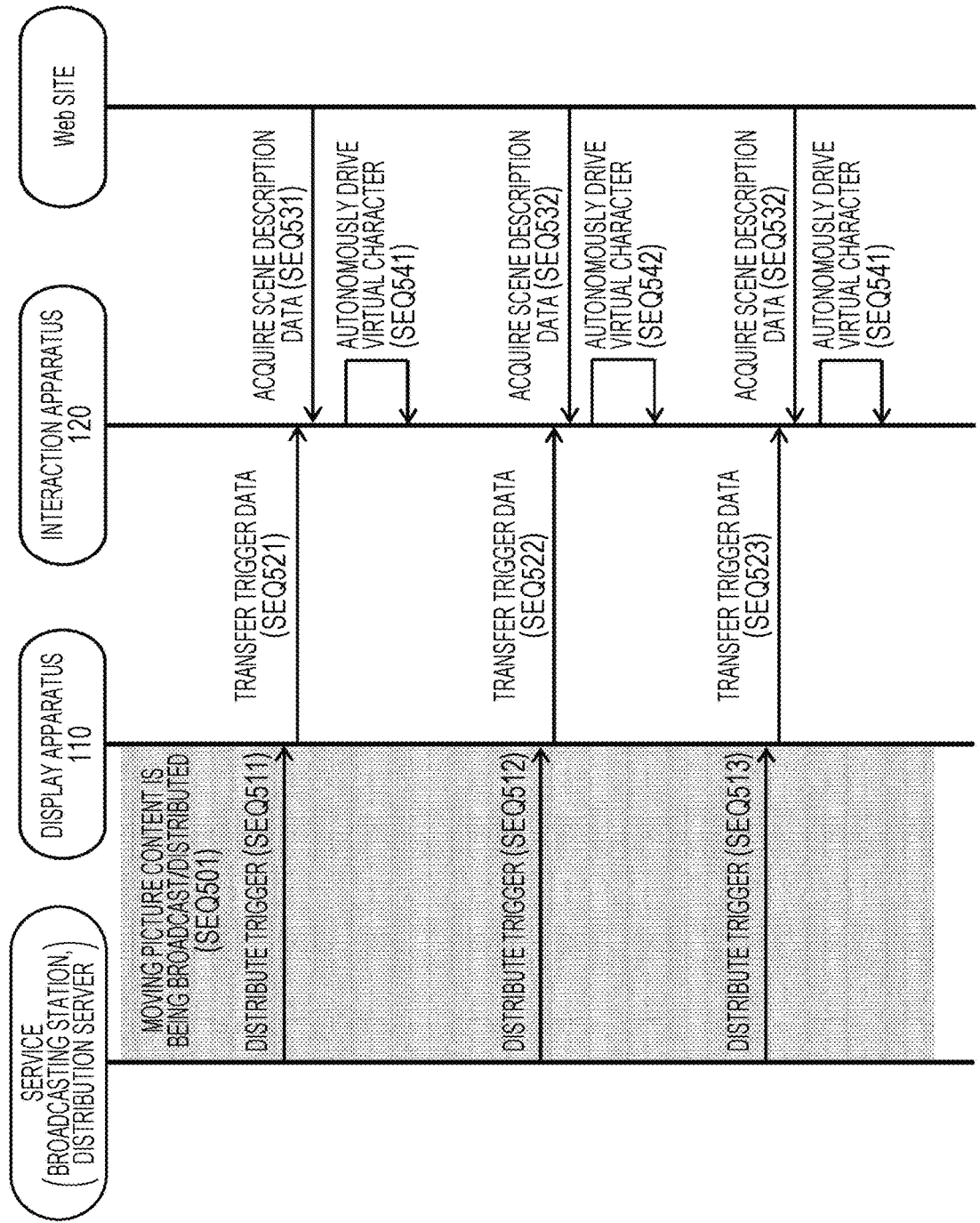
FIG. 5 is a diagram illustrating an example of an operation sequence in the interaction system 100.

FIG. 5 illustrates an example of an operation sequence for the interaction apparatus 120 to express an emotion while viewing the broadcast-type moving picture content in the interaction system 100 according to the present embodiment.

During a period of transmitting the broadcast-type moving picture content, the service side such as a broadcasting station and a stream distribution server sequentially executes a trigger distribution to notify that an event that can trigger the emotional expression and the like of the virtual character has occurred in the moving picture content.

In such an operation sequence example illustrated in FIG. 5, during such a period of distributing the broadcast-type moving picture content (SEQ 501), the service side such as a broadcasting station and a stream distribution server sequentially implements the trigger distribution for the display apparatus 110, which receives (tunes and receives) the moving picture content, every time an event occurs in the moving picture content (SEQ 511, SEQ 512, . . . ).

That is, the service side such as a broadcasting station and a stream distribution server implements the trigger distribution in synchronization with the occurrence of an event, which can be a trigger, in the broadcast-type moving picture content. In the case of a streaming service, a delay time such as a network delay may occur from the occurrence of an event in the moving picture content to the arrival of the trigger distribution at the display apparatus 110; however, it is assumed that the delay time is ignorable.

In the present embodiment, it is assumed that the service side implements the trigger distribution using means already defined by the standard of the broadcasting service and the standard of the stream distribution service.

For example, in the case of the broadcasting service, the broadcasting station side can implement the trigger distribution for the display apparatus 110 that tunes and receives a broadcast program using StreamEvent or the like. Association of Radio Industries and Business (ARIB) defines, as a transmission format of a broadcast signal, a Moving Picture Experts Group (MPEG)-2 transport stream (TS) packet in which a PSI table is multiplexed together with a content such as video and speech stream and data. A general-purpose event message is stored in a descriptor area of PMT that is one of such PSI tables, whereby the trigger distribution using StreamEvent can be implemented.

Further, in the case of a content streaming service, the service side such as a stream distribution server can implement the trigger distribution to the display apparatus 110, which receives a content stream, using WebSocket or the like. WebSocket is a protocol that operates on transmission control protocol (TCP) and defines that, once a server and a client make a connection, all necessary communication is performed on the connection using a dedicated protocol. An overhead of WebSocket due to a header is small between a Web server and a client, and WebSocket can achieve highly efficient transmission. WebSocket is defined as Request for Comments (RFC) 6455, "The WebSocket Protocol".

Regardless of which broadcasting standard or communication standard is used as a basis, the service side such as a broadcasting station and a stream distribution server transmits trigger data including information regarding a location or acquisition method of the scene description data (described above) to the display apparatus 110 in the trigger distribution (SEQ 511, SEQ 512, . . . ). The location or acquisition method of the scene description data can be described in the format of, for example, a uniform resource identifier (URI) or a uniform resource locator (URL).

Upon receiving the trigger data, for example, in the format of StreamEvent, WebSocket, or the like, the display apparatus 110 appropriately converts, according to needs, the trigger data into a data format processable by the interaction apparatus 120, and transfers the trigger data to the interaction apparatus 120 (SEQ 521, SEQ 522, . . . ).

The trigger data does not include the scene description data itself, and includes simple and small-capacity data that specifies the location or acquisition method of the scene description data in the format such as URI and URL. Hence, it is possible to transfer the trigger data using the simple communication means (described above) of only one-way communication between the display apparatus 110 and the interaction apparatus 120.

Upon receiving the trigger data from the display apparatus 110 (SEQ 521, SEQ 522, . . . ), the interaction apparatus 120 acquires scene description data from a predetermined website in accordance with the location or acquisition method specified in the trigger data in the format such as URI and URL (SEQ 531, SEQ 532, . . . ).

Then, the interaction apparatus 120 autonomously drives the virtual character, which is to be displayed on the sub-screen (display unit 303), on the basis of the acquired scene description data (SEQ 541, SEQ 542, . . . ).

Note that, at the time of transferring the trigger data to the interaction apparatus 120 (SEQ 521, SEQ 522, . . . ), the display apparatus 110 may also transmit, to the interaction apparatus 120, data of the virtual character (hereinafter, also referred to as "distribution character") to be displayed on the sub-screen. The data of the virtual character may be the one distributed as a multimedia content by the broadcasting station or the stream distribution server along with the moving picture content, or may be the one installed in the display apparatus 110 in advance. On the other hand, the interaction apparatus 120 also has a virtual character (hereinafter, also referred to as "my character") provided in advance. It is assumed that the interaction apparatus 120 selects either the "my character" or the distribution character and autonomously drives the selected character on the sub-screen.

The interaction apparatus 120 may control the action of the virtual character in a standalone manner; however, as illustrated in FIG. 4, may control the action of the virtual character by a cooperative operation of the interaction engine front end 410 and the interaction engine back end 420.

For example, when an event such as a scene in a climax occurs in a drama program which the user is viewing, the trigger distribution is performed from the service side, and in response to this, the trigger data is transferred from the display apparatus 110 to the interaction apparatus 120. Then, the interaction apparatus 120 can express such an action of the virtual character that speaks for a user's emotion or synchronizes with the user on the basis of the newly acquired scene description data.

Moreover, when an event such as scoring, conceding, and a fine play occurs while the user is viewing a sports program such as baseball or soccer, the trigger distribution is performed from the service side, and in response to this, the trigger data is transferred from the display apparatus 110 to the interaction apparatus 120. Then, on the basis of the newly acquired scene description data, the interaction apparatus 120 can express an action of the virtual character, which follows a progress of such a game and includes rejoicing together or nodding at scoring and fine play of a supported team, and saddening and discouraging at conceding and an error of the supported team, for example.

Moreover, while the user is viewing a news program, the trigger distribution is performed from the service side for each section such as domestic, international, social, economic, performing arts, sports, science, and region, and in response to this, the trigger data is transferred from the display apparatus 110 to the interaction apparatus 120. Then, the interaction apparatus 120 can express such an action of the virtual character that introduces a genre of interest to the user on the basis of the scene description data acquired sequentially.

Moreover, the trigger distribution is performed from the service side at the timing of the CM inserted in the main part of the broadcast or streaming program, and in response to this, the trigger data is transferred from the display apparatus 110 to the interaction apparatus 120. Then, the interaction apparatus 120 may perform the matching processing between the user's profile and the product, and change the way of recommending the product by the virtual character in response to a degree of interest of the user in the product, and the like.

Moreover, it is assumed that, no matter which type of event an action being executed by the virtual character may respond to, the virtual character responds to a question and a chat from the user.

FIG. 6 illustrates an example of the scene description data. Regarding an event such as a goal scene of soccer, this drawing includes a start time and end time of the event, a type of the event ("soccer"), a content of the event ("goaled", "team name", "scoring status"), and the like. Note that methods for expressing a scene from a video are various, and such scene description data as illustrated in FIG. 6 can be automatically generated on the basis of an existing method.

Figures 7, 8:
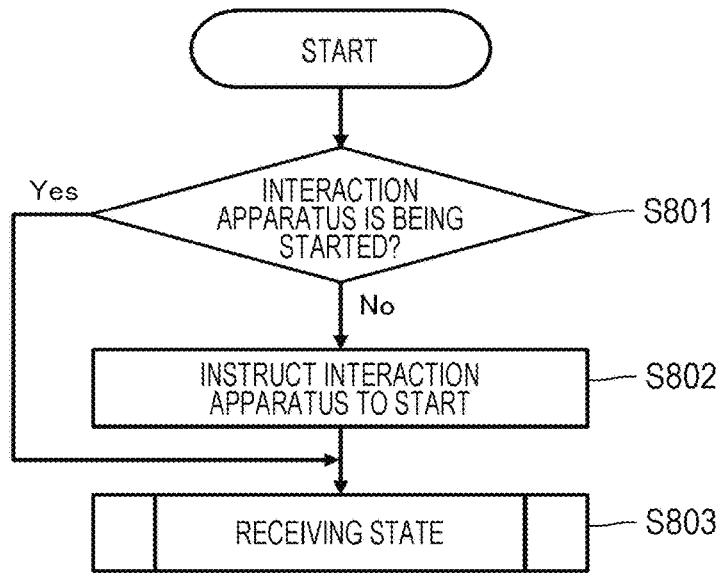
FIG. 7 is a diagram illustrating another example of the scene description data.
FIG. 8 is a flowchart illustrating a basic operation example of the display apparatus 110.

FIG. 7 illustrates another example of the scene description data. This drawing describes typical emotional expressions corresponding to a user's situation. Specifically, in an event type of "soccer", this drawing describes that a happy or sad emotion is expressed when an event of "goaled" occurs.

Note that the data describing specific information regarding the scene, which is as illustrated in FIG. 6, and the data suggesting the emotional expression corresponding to the scene, which is as illustrated in FIG. 7, may be used as individual scene description data files, and in the trigger data, a combination of these two data files may be specified as scene description data corresponding to the event. Alternatively, a single scene description data file including both of such a data portion as illustrated in FIG. 6 and a data portion as illustrated in FIG. 7 may be configured.

Moreover, a document structure or grammar for use in the scene description data is arbitrary, and FIGS. 6 and 7 illustrate merely an example.

Furthermore, the interaction apparatus 120 may determine whether or not to use the scene description data to be provided every time the event occurs in the moving picture content that is being viewed at the time of autonomously driving the virtual character or may determine how much to use the scene description data at that time. For example, the interaction apparatus 120 may determine whether or not to use the scene description data or how much to use the scene description data in accordance with a user's instruction.

Moreover, in the scene description data, it may be specified whether the description content of the scene description data is essential or arbitrary.

FIG. 8 illustrates a basic operation example of the display apparatus 110 in the format of a flowchart.

When a main power supply is turned on and the display apparatus 110 starts, the display apparatus 110 checks whether or not the interaction apparatus 120 paired therewith is started (step S801).

Then, in a case where the interaction apparatus 120 is not started yet, the display apparatus 110 instructs the interaction apparatus 120 to start (step S802), sets the interaction apparatus 120 to a receiving state of being capable of receiving the trigger data and the like from the display apparatus 110 (step S803), and ends this process.

Note that, in the case of a system configuration of interacting with the user using not the interaction apparatus 120 but an MR device or a pet-type robot, a startup state of the MR device or the pet-type robot is checked in step S801, and the MR device or the pet-type robot is started to be made into a receivable state in step S802. Moreover, in the case of a system configuration of displaying the virtual character on a child screen provided in the screen of the display apparatus 110, a startup state of an application for automatically driving the virtual character is checked, and in step S802, this application is made into a receivable state.

Figure 9:
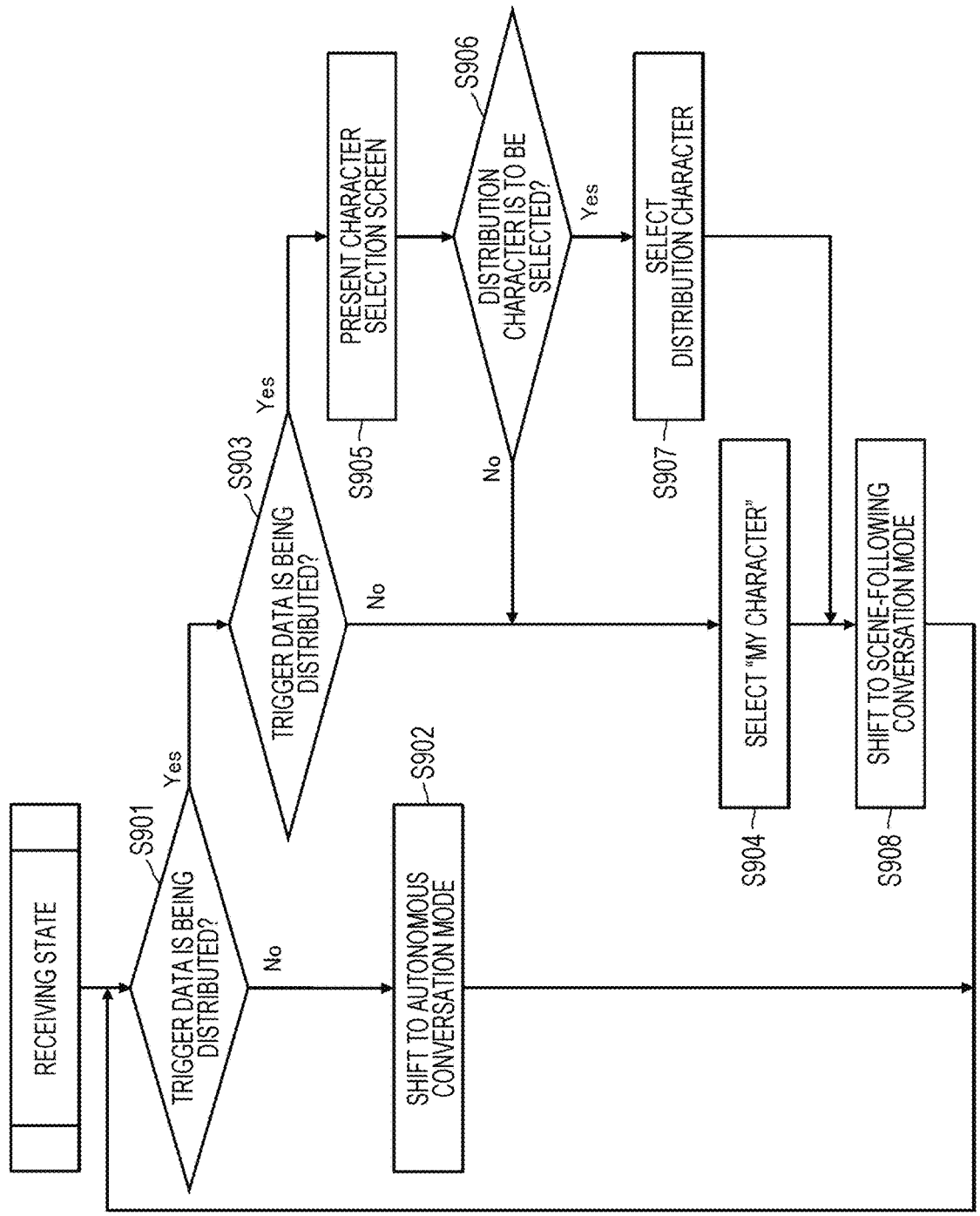
FIG. 9 is a flowchart illustrating a procedure of a processing operation to be implemented by the interaction apparatus 120 in a receiving state.

FIG. 9 illustrates a procedure of a processing operation implemented by the interaction apparatus 120 in a receiving state in the format of a flowchart.

The interaction apparatus 120 checks whether or not the trigger data is distributed from the display apparatus 110 (step S901).

When the trigger data is not distributed from the display apparatus 110 (No in step S901), the interaction apparatus 120 shifts to an autonomous conversation mode (step S902), and waits until the trigger data is distributed while causing the virtual character to autonomously interact with the user regardless of the content (scene) of the broadcast-type moving picture content displayed on the screen of the display apparatus 110.

On the other hand, when the trigger data is distributed from the display apparatus 110 (Yes in step S901), the interaction apparatus 120 further checks whether or not the data of the distribution character is also distributed from the display apparatus 110 (step S903).

In a case where the distribution character is not distributed from the display apparatus 110 (No in step S903), the interaction apparatus 120 selects the "my character" (step S904).

Moreover, in a case where the distribution character is distributed from the display apparatus 110 (Yes in step S903), the interaction apparatus 120 presents the user with a character selection screen including a list of distribution characters selectable (in other words, capable of being autonomously driven on the interaction apparatus 120) (step S905).

Then, when the user selects any of the distribution contents from the character list screen (Yes in step S906), the interaction apparatus 120 selects to display the distribution character selected by the user on the display unit 303 and drive the selected distribution character autonomously (step S907).

Moreover, in a case where the user does not select any of the distribution contents from the character list screen (No in step S906), the interaction apparatus 120 selects the "my character" (step S904), and displays the "my character" on the display unit 303 and drive the same autonomously.

Then, upon selecting either the "my character" or the distribution character as described above, the interaction apparatus 120 shifts to a scene-following conversation mode (step S908). In this scene-following conversation mode, the interaction apparatus 120 interacts with the user using either the selected "my character" or distribution character on the basis of the scene description data acquired in accordance with the location or acquisition method specified in the trigger data.

Thereafter, the interaction apparatus 120 has a conversation with the user using the selected "my character" or distribution character until the next trigger data is distributed from the display apparatus 110.

Figure 10:
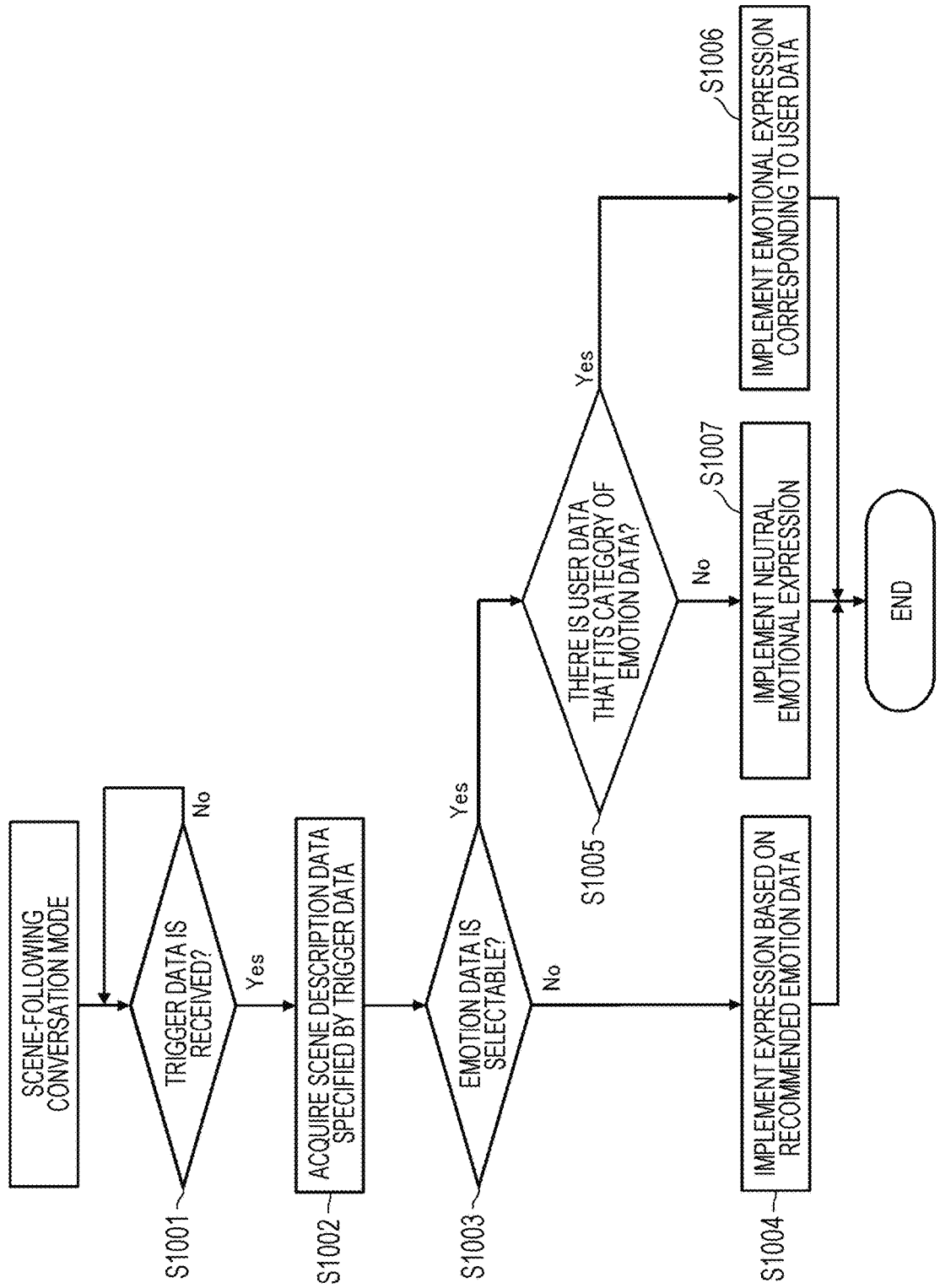
FIG. 10 is a flowchart illustrating a processing operation of the interaction apparatus 120 in a scene-following conversation mode.

FIG. 10 illustrates a procedure of a processing operation to be implemented by the interaction apparatus 120 in a scene-following conversation mode in the format of a flowchart.

Upon receiving the trigger data from the display apparatus 110 (Yes in step S1001), the interaction apparatus 120 acquires the scene description data in accordance with the location or acquisition method specified in the trigger data (step S1002).

Subsequently, the interaction apparatus 120 checks whether or not it is possible to select any emotion data (step S1003).

When it is not possible to select the emotion data (No in step S1003), the interaction apparatus 120 drives the virtual character to perform an expression based on recommended emotion data specified in the scene description data (step S1004).

On the other hand, in a case where it is possible to select the emotion data (Yes in step S1003), the interaction apparatus 120 further checks whether or not there is user data that fits a category of the emotion data (step S1005).

Then, in a case where there is user data that fits the category of the emotion data (Yes in step S1005), the interaction apparatus 120 drives the virtual character to express an emotion according to the user data (step S1006).

Moreover, in a case where there is no user data that fits the emotion data category (No in step S1005), the interaction apparatus 120 drives the virtual character to perform a neutral emotional expression (step S1007).

INDUSTRIAL APPLICABILITY

The detailed description has been given above of the technology disclosed in the present description with reference to the specific embodiment. However, it is self-evident that those skilled in the art can modify the embodiment or allow substitution therefor within the scope without departing from the spirit of the technology disclosed in the present disclosure.

The technology disclosed in the present disclosure can be suitably applied to a system for viewing the broadcast-type moving picture content. Although the embodiment applied to the MPEG-2 system has been mainly described in the present description, the scope of application of the technology disclosed in the present description is not limited thereto. For example, the technology disclosed in the present description can be similarly applied to other moving picture distribution systems such as MPEG-4 and MPEG-Dynamic Adaptive Streaming over HTTP (DASH).

In short, the technology disclosed in the present description has been described in the form of exemplification, and the stated contents of the present description should not be interpreted in a limited manner. In order to determine the spirit of the technology disclosed in the present description, the scope of claims should be taken into consideration.

Note that it is also possible for the technology disclosed in the present description to adopt such configurations as follows.

(1) An information processing apparatus including:
a receiving unit that receives a broadcast-type moving picture content; and
a notification unit that notifies a second device of data including a location or acquisition method of information suggesting an action of a virtual character, the action corresponding to an event that occurs in the moving picture content.

(2) The information processing apparatus according to the above (1), in which
the receiving unit receives the moving picture content to be broadcast or streamed.

(3) The information processing apparatus according to the above (1) or (2),
in which the notification unit notifies the second device of the data in response to a fact that the receiving unit has receives a trigger of the event.

(4) The information processing apparatus according to the above (3), in which
the receiving unit receives the trigger of the event by StreamEvent or WebSocket.

(5) The information processing apparatus according to any one of the above (1) to (4), in which
the information processing apparatus is a television receiver provided with a display unit that displays the broadcast-type moving picture content.

(6) An information processing method including:
a receiving step of receiving a broadcast-type moving picture content;
a displaying step of displaying the moving picture content on a display unit; and
a notifying step of notifying, in response to an event that occurs in the moving picture content, a second device of data including a location or acquisition method of information suggesting an action of a virtual character.

(7) An information processing apparatus including:
a receiving unit that receives, from a first device, a notice of data including a location or acquisition method of information suggesting an action of a virtual character, the action corresponding to an event that occurs in a broadcast-type moving picture content; and
a control unit that acquires the information on the basis of the data issued as the notice from the first device, and controls driving of the virtual character on the basis of the acquired information.

(8) The information processing apparatus according to the above (7), in which
the receiving unit receives the notice from the first device as a television receiver that receives the broadcast-type moving picture content.

(9) The information processing apparatus according to the above (7) or (8), further including a display unit capable of two-dimensional or three-dimensional display, in which
the control unit controls the driving of the virtual character to be displayed using the display unit.

(10) The information processing apparatus according to the above (7) or (8), in which
the control unit displays the virtual character using an MR device.

(11) The information processing apparatus according to the above (7) or (8), in which
the control unit displays the virtual character on a child screen of the first device as a television receiver that receives the broadcast-type moving picture content.

(12) The information processing apparatus according to the above (7) or (8), in which
the control unit controls driving of a pet-type robot on the basis of the acquired information.

(13) The information processing apparatus according to any one of the above (7) to (12), in which
the control unit acquires the data including position information of the event in the moving picture content, a type of the event, and a content of the event.

(14) The information processing apparatus according to any one of the above (7) to (13), in which
the control unit acquires the data including information regarding an emotional expression of the virtual character for the event.

(15) The information processing apparatus according to any one of the above (7) to (14), in which
the receiving unit further receives data of the virtual character from the first device.

(16) An information processing method including:
a receiving step of receiving, from a first device, a notice of data including a location or acquisition method of information suggesting an action of a virtual character, the action corresponding to an event that occurs in a broadcast-type moving picture content;
an acquiring step of acquiring the information on the basis of the data issued as the notice from the first device; and
a controlling step of controlling driving of the virtual character on the basis of information acquired in the acquiring step.

(17) An information processing system including:
a first device that receives a broadcast-type moving picture content; and
a second device that controls driving of a virtual character, in which
in response to receiving a trigger of the event, the first device notifies the second device of data including a location or acquisition method of information suggesting an action of the virtual character, the action corresponding to an event that occurs in the moving picture content, and
the second device acquires the information on the basis of the data issued as a notice from the first device, and controls driving of the virtual character.

(18) A computer program written in a computer-readable format to cause a computer to function as:
a receiving unit that receives a broadcast-type moving picture content; and
a notification unit that notifies a second device of data including a location or acquisition method of information suggesting an action of a virtual character, the action corresponding to an event that occurs in the moving picture content.

(19) A computer program written in a computer-readable format to cause a computer to function as:
a receiving unit that receives, from a first device, a notice of data including a location or acquisition method of information suggesting an action of a virtual character, the action corresponding to an event that occurs in a broadcast-type moving picture content;
a control unit that acquires the information on the basis of the data issued as the notice from the first device; and
a control unit that controls driving of the virtual character on the basis of the acquired information.

REFERENCE SIGNS LIST

100 Interaction system
110 Display apparatus
120 Interaction apparatus
201 Control unit
202 Bus
203 Storage unit
204 Communication interface (IF) unit
205 Extension interface (IF) unit
206 Tuner/demodulator unit
207 Demultiplexer
208 Video decoder
209 Speech decoder
210 Superimposed character decoder
211 Subtitle decoder
212 Subtitle synthesis unit
213 Data decoder
214 Cache unit
215 Application (AP) control unit
216 Browser unit
217 Sound source unit
218 Video synthesis unit
219 Display unit
220 Speech synthesis unit
221 Speech output unit
222 Operation input unit
301 Processing unit
302 Communication unit
303 Display unit
304 Speech input unit
305 Speech output unit
306 Sensor unit
307 Recording unit
410 Interaction engine front end
420 Interaction engine back end
421 Speech recognition unit
422 Semantic analysis unit
423 Speech synthesis unit
424 Control unit
430 External agent service
431 Speech recognition unit
432 Semantic analysis unit
433 Processing unit
434 Speech synthesis unit
440 Speech agent device
441 Speech input unit
442 Speech output unit

The invention claimed is:

1. An information processing apparatus, comprising:
receiving circuitry configured to receive, from a first device configured to receive broadcast-type moving picture content, a notice of data including a location or an acquisition method of information suggesting an action of a virtual character, the action corresponding to an event that occurs in the broadcast-type moving picture content; and
processing circuitry configured to acquire the information based on the data, determine whether user data that fits a category of emotion data exists, control the virtual character to implement a first emotional expression in response to determining that the user data that fits the category does not exist, and control the virtual character to implement a second emotional expression different from the first emotional expression and corresponding to the user data, in response to determining that the user data that fits the category exists.

2. The information processing apparatus according to claim 1, wherein the receiving circuitry is further configured to receive the notice from the first device, which includes a first display configured to display the broadcast-type moving picture content.

3. The information processing apparatus according to claim 2, wherein the processing circuitry is further configured to display the virtual character on a child screen of the first display.

4. The information processing apparatus according to claim 1, further comprising a second display capable of two-dimensional or three-dimensional display, wherein the processing circuitry is further configured to control the virtual character displayed using the second display.

5. The information processing apparatus according to claim 1, wherein the processing circuitry is further configured to display the virtual character using a mixed reality device.

6. The information processing apparatus according to claim 1, wherein the processing circuitry is configured to control a pet-type robot based on the acquired information and the user data related to the broadcast-type moving picture content.

7. The information processing apparatus according to claim 1, wherein the processing circuitry is further configured to acquire the information that includes a start time or an end time of the event in the broadcast-type moving picture content, a category of the event, and a content of the event.

8. The information processing apparatus according to claim 1, wherein the processing circuitry is further configured to acquire the information including emotional expression information of the virtual character for the event.

9. The information processing apparatus according to claim 1, wherein the receiving circuit is further configured to receive data of the virtual character from the first device.

10. The information processing apparatus according to claim 1, wherein the processing circuitry is further configured to control the virtual character based on the acquired information that includes a category or content of the event and based on the user data related to the category or content of the event.

11. The information processing apparatus according to claim 10, wherein the processing circuitry is further configured to control the virtual character based on the acquired information that includes the category or content of the event and based on the user data on a degree of interest of the user in the category of the event, on a degree of interest of the user in a product specified in the content of the event, or on whether the user supports a team or individual specified in the content of the event.

12. An information processing method, comprising:
receiving, by receiving circuitry and from a first device configured to receive broadcast-type moving picture content, a notice of data including a location or an acquisition method of information suggesting an action of a virtual character, the action corresponding to an event that occurs in the broadcast-type moving picture content;
acquiring, with processing circuitry, the information based on the data;
determining whether user data that fits a category of emotion data exists, controlling the virtual character to implement a first emotional expression in response to determining that the user data that fits the category does not exist and controlling, with the processing circuitry, the virtual character to implement a second emotional expression different from the first emotional expression and corresponding to the user data, in response to determining that the user data that fits the category exists.

* * * * *